United States Patent Office 2,741,539
Patented Apr. 10, 1956

2,741,539

METHOD FOR PREPARING POTASSIUM BOROHYDRIDE

Mario D. Banus, Ipswich, and Robert W. Bragdon, Marblehead, Mass., assignors to Metal Hydrides Incorporated, Beverly, Mass., a company of Massachusetts No Drawing. Application August 16, 1952, Serial No. 304,840

8 Claims. (Cl. 23—14)

This invention relates to the preparation of the alkali metal borohydrides of potassium, rubidium and cesium.

The alkali metal borohydrides were discovered several years ago. Their preparation is described in the United States patent to H. I. Schlesinger and H. C. Brown No. 2,534,533. One method described in that patent comprises reacting an alkali metal hydride and an alkyl borate. Sodium borohydride is now being prepared commercially by this method. When sodium hydride is used the reaction is as follows:

$$4NaH + B(OCH_3)_3 \rightarrow NaBH_4 + 3NaOCH_3 \quad (1)$$

A second method described in the above mentioned patent comprises reacting an alkali metal and an alkyl borate with hydrogen under pressure. When sodium is used the reaction is as follows:

$$4Na + 2H_2 + (CH_3O)_3B \rightarrow NaBH_4 + 3NaOCH_3 \quad (2)$$

A third method described in the above mentioned patent comprises reacting an alkali metal hydride with an alkali metal alkoxy borohydride. The reaction, when using sodium hydride and sodium trimethoxy borohydride, is as follows:

$$3NaH + NaBH(OCH_3)_3 \rightarrow NaBH_4 + 3NaOCH_3 \quad (3)$$

A fourth method described in the above mentioned patent comprises reacting an alkali metal hydride with boric oxide. When sodium hydride is used the reaction is probably as follows:

$$4NaH + 2B_2O_3 \rightarrow NaBH_4 + 3NaBO_2 \quad (4)$$

Another method which has been proposed for the preparation of sodium borohydride comprises reacting sodium metal plus hydrogen under a pressure with boric oxide. The reaction probably is as follows:

$$4Na + 2H_2 + 2B_2O_3 \rightarrow NaBH_4 + 3NaBO_2 \quad (5)$$

The above mentioned patent states that reaction products as illustrated by the above Equations 1 to 4 may be leached with a liquid, such as isopropylamine, which is a solvent for sodium borohydride and is a non-solvent for the other reaction product. The solvent then may be removed from the solution by evaporation to obtain solid sodium borohydride.

Another method which has been proposed for the preparation of sodium borohydride comprises reacting sodium metal plus hydrogen under pressure with sodium borofluoride. The reaction probably is as follows:

$$4Na + 2H_2 + NaBF_4 \rightarrow NaBH_4 + 4NaF \quad (6)$$

So far as we are aware, the method illustrated by Equation 1 above is the most satisfactory method presently available for preparing sodium borohydride on a commercial scale. This method, however, has two obvious disadvantages which tend to render it unsuitable for preparing potassium borohydride on a commercial scale. Thus, the use of potassium hydride is hazardous because it explodes on contact with air. Also, the cost of potassium hydride is high and, since this method requires four molecules of potassium hydride to produce one molecule of potassium borohydride, the method wastes the greater part of this costly compound.

In general, the chemical and physical properties of corresponding sodium and potassium compounds are very similar. There are many solvents in which corresponding sodium and potassium compounds are very soluble. Sodium hydroxide, sodium acetate and sodium chloride and the corresponding potassium compounds, for example, are all very soluble in water. There are, however, a few exceptions to this general rule. For example, potassium amide is very soluble while sodium amide is practically insoluble in liquid ammonia and potassium fluoride is very soluble while sodium fluoride is only slightly soluble in water.

Likewise, the chemical and physical properties of the borohydrides of sodium and potassium are, in general, very similar. Thus, Schlesinger and Brown, who are pioneers in the alkali metal borohydride field, state in their above mentioned patent that the properties of potassium borohydride are, with few minor differences, like those of sodium borohydride. There are many solvents in which both sodium and potassium borohydrides are very soluble. The borohydrides of sodium and potassium are both very soluble, for example, in liquid ammonia. On the other hand, while methanol, ethanol and isoproplamine, for example, are good solvents for sodium borohydride, potassium borohydride is relatively insoluble in these solvents.

The present invention takes advantage of the facts that the corresponding compounds of sodium and potassium as well as sodium and potassium borohydrides in general possess similar solubility characteristics in a given solvent yet in some instances the sodium compound is very soluble in a given solvent while the corresponding potassium compound is relatively insoluble. Thus, in view of the fact that potassium borohydride is markedly less soluble than sodium borohydride in certain solvents and in view of the fact that corresponding potassium and sodium compounds in general possess comparable solubilities in a given solvent, we conceived the idea that by mixing another selected potassium compound with sodium borohydride in a selected solvent for both we could produce a reaction liquor containing a sodium compound reaction product in solution and potassium borohydride in solid form. We further conceived that potassium borohydride could be obtained in this manner in substantially quantitative yield, even when using a solvent for sodium borohydride in which potassium borohydride is slightly soluble, if the amount of solvent used is not substantially greater than that required to produce a substantially saturated solution of the two reactants. Investigation has confirmed these conceptions. Borohydrides of rubidium and cesium may be produced in a similar manner.

While stoichiometrical proportions of the reactants may be used, in practice we prefer to use a slight excess of the selected compound of potassium, rubidium or cesium to assure maximum yield. When solutions of each of the reactants are used, the reaction usually is completed nearly as soon as the two solutions are thoroughly mixed. Mixing can be accomplished quickly by stirring.

In the preferred practice of the invention, the solvent and the amount thereof used and the potassium compound used as a reactant are selected so that the sodium compound formed as a reaction product is in solution in the reaction liquor and the potassium borohydride is precipitated. However, the solvent and the amount thereof used and the potassium compound used as a reactant may be selected so that the sodium compound formed as a reaction product is precipitated and the potassium borohydride is in solution in the reaction liquor. Thus, in its broad aspect the invention contemplates the preparation of a borohydride of an alkali metal selected from the group consisting of potassium, rubidium and cesium by mixing another compound of the selected alkali metal with sodium borohydride in the presence of a solvent for both to form a reaction liquor in which one of the reaction products is in solution and the other is in solid form.

In accordance with one illustrative practice of the invention, a methanol solution of sodium borohydride is mixed, preferably, at normal room temperature with a methanol solution of potassium hydroxide. Potassium borohydride is precipitated and may be recovered in substantially quantitative yield. A lower temperature may be used but a temperature higher than about 50° C. is not recommended. The reaction is as follows:

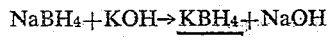
$$NaBH_4 + KOH \rightarrow KBH_4 + NaOH$$

In place of potassium hydroxide other potassium compounds may be used, such as potassium methoxide or other alkoxide, the iodide, bromide, acetate, etc., the sodium compound produced being soluble in methanol. In place of the potassium compound, we may use a rubidium or cesium compound, such as the hydroxide, methoxide, etc., to obtain a precipitate of rubidium or cesium borohydride.

When it is desired to obtain the borohydrides of potassium, rubidium or cesium directly as a precipitate, illustrative solvents which may be used are water, lower aliphatic alcohols, such as methanol or ethanol, and certain amines, such as isopropylamine, and mixtures thereof, mixtures of isopropyl alcohol and water, mixtures of ethylene diamine and methanol and mixtures of pyridine and methanol. When using mixtures of ethylene diamine and methanol and mixtures of pyridine and methanol, a suitable reactant is potassium thiocyanate.

When using water as a solvent to obtain a precipitate of the desired borohydride, illustrative corresponding reactant compounds are the hydroxide, the acetate, iodide, etc. When using methanol or ethanol as a solvent, illustrative reactant compounds are the hydroxide, acetate, iodide, methoxide or other alkoxide, etc. When using isopropylamine as the solvent, illustrative reactant compounds are the iodide, thiocyanate, etc. When a mixture of isopropylamine and water is used as the solvent, illustrative reactant compounds are the iodide, thiocyanate, acetate, bromide, etc.

As illustrative of the practice of the invention to obtain a solution of the desired borohydride and a precipitate of the sodium compound reaction product, we may mention the reaction of potassium amide with sodium borohydride in liquid ammonia as the solvent. In this aspect of the invention, water may be used as the solvent but in sufficient amount to assure solution of the desired borohydride. Thus, potassium fluoride may be reacted with sodium borohydride in water as the solvent to obtain a solution of potassium borohydride and a precipitate of sodium fluoride.

In the light of the present disclosure, those skilled in the art may readily select suitable solvents which may be used as well as suitable compounds which may be used as reactants with sodium borohydrides in the practice of the invention. These selections are based upon the relative solubilities of the various compounds involved in solvents for sodium borohydride. Thus, the solvent used must be selected from solvents for sodium borohydride. The compound used for reaction with sodium borohydride must be selected from those which are soluble in the selected solvent. In addition, the solvent selected must be a solvent for one of the reaction products and substantially a non-solvent or a poor solvent for the other reaction product. It is obvious that the solvent used may be a single compound or a mixture of compounds.

The method of the invention is especially applicable for the preparation of borohydrides of potassium, rubidium or cesium from a reaction mixture containing sodium borohydride prepared by a known method, such as by any one of the methods illustrated by Equations 1 to 6 above. Thus, sodium hydride may be reacted with an alkyl borate, such as methyl borate, as illustrated by Equation 1 above to form a reaction mixture which is essentially sodium borohydride and sodium methoxide. This reaction product contains the excess sodium hydride used and may contain a small amount of sodium trimethoxy borohydride. The reaction product may be treated with methanol to form a solution comprising sodium borohydride and sodium methoxide in methanol, the sodium hydride being converted to sodium methoxide and the sodium trimethoxy borohydride being converted to sodium methoxide and methyl borate and going into solution. To this solution may be added a methanol solution of potassium hydroxide whereby potassium borohydride is precipitated, the sodium hydroxide formed as a reaction product remaining in solution in the reaction liquor. This precipitate may be separated from the solution by filtration. By washing the precipitate with a solvent for the by-products, such as cold ethyl alcohol, substantially all the by-products can be removed. The washed precipitate may be dried in a vacuum oven at a low temperature, such as about 70° C., and a high yield of high purity potassium borohydride obtained. In place of the potassium compound, we may use a rubidium or cesium compound, such as the hydroxide, methoxide, etc., and obtain a precipitate of rubidium borohydride or cesium borohydride. In place of methanol, various other solvents may be used, such as ethanol, as will be readily understood by those skilled in the art. It will be noted that in this phase of the invention, the solvent used should be a solvent for the sodium compound of the reaction mixture treated and the sodium compound formed as a reaction product.

The conceptions upon which the present invention is based make possible another method for preparing potassium, rubidium or cesium borohydrides. Thus, if potassium, rubidium or cesium hydride or the corresponding metal is used in place of sodium hydride or sodium metal plus hydrogen in the reactions illustrated by Equations 1 to 6 above, the reaction product may be treated with a suitable solvent, such as methanol or ethanol, to dissolve the undesired component, such as potassium, rubidium or cesium alkoxide, and leave the alkali metal borohydride as an undissolved solid. The solid alkali metal borohydride then may be separated from the solution as by filtration.

The invention is illustrated further by the following specific examples:

*Example 1*

Sodium hydride and methyl borate were reacted to form a reaction product as illustrated by Equation 1 above. 911 grams of this reaction product (containing 16.1 per cent sodium borohydride, 7.85 per cent sodium hydride and 76 per cent sodium methoxide by weight) were added to 4530 cc. of anhydrous methanol. The dark solution was filtered to remove a small quantity of carbonaceous material. 289 grams of 85% assay potassium hydroxide (10 per cent excess) were dissolved in 1820 cc. of methanol and decanted from the small amount of insoluble material into the solution of the above reaction product. A white precipitate was immediately formed and was isolated by filtration followed by washing with 500 cc., 1000 cc. and 200 cc. portions of methanol. The precipitate was then dried in a vacuum oven (3–10 mm. of mercury) at 70° overnight. The product weighed 189.3 grams, the crude yield being 90.8 per cent of the theoretical yield. The product liberated 98.8 per cent of the theoretical amount of hydrogen on acid hydrolysis. In contrast with the above, the average yield of sodium borohydride extracted from the reaction mix prepared by reacting sodium hydride with methyl borate is 80% of 90–95% pure material.

Example 2

Rubidium metal (10.8 grams) was dissolved in 750 cc. of absolute methanol to obtain a clear water-white solution of rubidium methoxide. This solution was concentrated by distilling off the excess methanol to obtain a nearly saturated methoxide solution. 4.93 grams of 99% pure sodium borohydride dissolved in a minimum amount of methanol was added to the methoxide solution with vigorous stirring. A white precipitate formed which was isolated by filtration followed by two washes with fresh methanol. The product was dried in a vacuum oven at 80° C. and 3–5 mm. of mercury for two hours. The product weighed 11 grams representing a crude yield of 86 per cent. The product contained 84.5% rubidium, 10.74% boron and 4.00% hydrogen. Theory calls for 85.2% rubidium, 10.79% boron and 4.02% hydrogen.

Example 3

This procedure used in this example was identical to that used in Example 2 except that cesium metal was used instead of rubidium metal. The cesium methoxide prepared from 10.66 grams of cesium metal was reacted with 3.06 grams of 99% pure sodium borohydride and yielded 8.6 grams of cesium borohydride, representing a crude yield of 72.4 per cent. The product contained 89.44% cesium, 7.37% boron and 2.71% hydrogen. Theory calls for 89.95% cesium, 7.32% boron and 2.73% hydrogen.

Example 4

74.2 grams of 94.7% sodium borohydride dissolved in 130 cc. of water was added to 132.2 grams of potassium hydroxide (85% assay) dissolved in 110 cc. of water. The reaction mixture was stirred vigorously during the addition. The thick slurry was filtered through a medium porosity glass sinter disk under nitrogen pressure. The precipitate then was washed with 100 cc. of ice-cold 95% ethyl alcohol which was mixed with the solid and then forced through the filter. This was repeated with another 100 cc. aliquot and then with a 50 cc. aliquot of fresh ice-cold 95% ethyl alcohol. The product was then dried in the vacuum oven at 3–5 mm. mercury pressure and 80° C. for three hours. 75.5 grams of 97.5% potassium borohydride were obtained representing a crude yield of 75.5 per cent.

Example 5

31 grams of potassium thiocyanate (KCNS) was dissolved in 1167 grams of isopropylamine dried over sodium hydroxide. To this solution, with stirring, was added a solution of 30 grams of sodium borohydride dissolved in 400 cc. of isopropylamine. Considerable heat was evolved during the addition and a dense, fine, white precipitate was formed. 844 grams of isopropylamine were distilled from the mixture and the rest was filtered to separate it from the potassium borohydride precipitate. The precipitate was washed with 100 cc. of fresh isopropylamine, then vacuum dried at 120–125° C. for three hours. The resulting potassium borohydride was 90 per cent pure and the chemical yield of the process was 100 per cent.

Example 6

18 grams of 93 per cent sodium borohydride was added to 50 grams of potassium acetate dissolved in 300 cc. of methanol. The mixture was stirred for 2 hours. The white precipitate formed was immediately filtered and washed twice with 100 cc. portions of methanol. The product was dried in vacuum at 80° C. for 24 hours. An 88.3 per cent crude yield of 99.2 per cent pure potassium borohydride was obtained.

Example 7

17 grams of 93% sodium borohydride dissolved in 300 cc. of 95% ethanol was added to 60 grams of potassium acetate partially dissolved in 300 cc. of 95% ethanol. The mixture was stirred for one-half hour. The white precipitate which had formed rapidly was filtered and washed three times with 600 cc. portions of methanol. The product was dried at 80° C. in vacuum. An 84.5% crude yield of 99.1% pure potassium borohydride was obtained.

Example 8

18 grams of 93% sodium borohydride dissolved in 200 grams of a mixture of isopropylamine with 10% water was added to 90 grams of potassium iodide dissolved in 600 grams of the isopropylamine-water mixture. The precipitate formed immediately. The mixture was stirred for one hour. The precipitate was filtered and washed twice with 75 cc. portions of methanol. The product was dried in vacuum at 70° C. A 100 per cent crude yield of 83.5% pure potassium borohydride was obtained.

Example 9

14 grams of 93% pure sodium borohydride was added to 55 grams of potassium thiocyanate dissolved in 280 grams of a mixture of isopropylamine with 10% water. The mixture was stirred for one hour and the precipitate was filtered and washed twice with 100 cc. portions of methanol. The product was dried at 70° C. for two hours. An 81.3% crude yield of 99.1% pure potassium borohydride was obtained.

Example 10

10.2 grams of 93% sodium borohydride and 16.5 grams of 85% potassium hydroxide were weighed into a flask. 80 cc. of a 7:1 mixture of isopropyl alcohol and water were added and the mixture was shaken vigorously for one-half hour and cooled under tap water to dissipate the heat of solution. The reaction mixture was then filtered and the precipitate washed with three 50 cc. portions of methanol. The product was dried in a vacuum oven at 80° C. for two hours. 12.2 grams of 97.3% pure potassium borohydride were obtained. Crude yield was 90.3%; chemical yield was 87.8%.

Example 11

41 grams of a mixture containing 78 per cent of potassium methoxide and 22 per cent potassium borohydride was washed with two 100 cc. portions of methanol. The residue was dried. Eight grams of 97 per cent potassium borohydride was obtained representing a crude yield of 89 per cent.

The claims of the present application are limited to the preparation of a borohydride of an alkali metal selected from the group consisting of potassium, rubidium and cesium by reacting another compound of the selected alkali metal with sodium borohydride in the presence of a solvent selected from amines to form a reaction liquor in which the sodium compound produced is in solution and the selected borohydride is precipitated.

In our copending application Serial No. 304,848, filed August 16, 1952, now abandoned, we have presented claims to the preparation of such borohydrides by another compound of the selected alkali metal directly with a reaction mixture consisting of sodium borohydride and another sodium compound in the presence of a solvent selected to provide a reaction liquor in which both the sodium compound produced and that of said reaction mixture are in solution and the selected borohydride is precipitated.

We claim:

1. In a method for preparing potassium borohydride, the steps which consist in selecting a solvent for sodium borohydride from the group consisting of isopropylamine, a mixture of isopropylamine and water, a mixture of ethylene diamine and methanol, and a mixture of pyridine and methanol, selecting a potassium compound other than the borohydride which as well as the corresponding sodium compound is soluble in the selected solvent, mixing a substantially saturated solution of the selected potassium compound in the selected solvent with a substantially saturated solution of sodium borohydride in the selected solvent thereby precipitating potassium borohydride in the resulting reaction liquor which contains said sodium compound in solution therein, and separating the precipitated borohydride.

2. The method as described by claim 1 in which the solvent is isopropylamine and the potassium compound is thiocyanate.

3. The method as described by claim 1 in which the solvent is isopropylamine and the potassium compound is the iodide.

4. The method as described by claim 1 in which the solvent is a mixture of isopropylamine and water and the potassium compound is selected from the group consisting of the iodide and the bromide.

5. The method as described by claim 1 in which the solvent is a mixture of isopropylamine and water and the potassium compound is the thiocyanate.

6. The method as described by claim 1 in which the solvent is a mixture of isopropylamine and water and the potassium compound is the acetate.

7. The method as described by claim 1 in which the solvent is a mixture of ethylene diamine and methanol and the potassium compound is the thiocyanate.

8. The method as described by claim 1 in which the solvent is a mixture of pyridine and methanol and the potassium compound is the thiocyanate.

References Cited in the file of this patent
UNITED STATES PATENTS

| | | |
|---|---|---|
| 1,990,896 | Connell | Feb. 12, 1935 |
| 2,461,661 | Schlesinger | Feb. 15, 1949 |
| 2,461,662 | Schlesinger | Feb. 15, 1949 |
| 2,461,663 | Schlesinger | Feb. 15, 1949 |
| 2,532,217 | Winternitz | Nov. 28, 1950 |
| 2,534,533 | Schlesinger | Dec. 19, 1950 |
| 2,542,746 | Banus | Feb. 20, 1951 |
| 2,545,633 | Schlesinger | Mar. 20, 1951 |
| 2,575,760 | Hoekstra | Nov. 20, 1951 |
| 2,576,311 | Schlesinger | Nov. 27, 1951 |
| 2,599,203 | Schlesinger | June 3, 1952 |
| 2,615,788 | Gibb | Oct. 28, 1952 |

OTHER REFERENCES

Bulletin 502A, "Sodium Borohydride," published by Metal Hydrides, Inc.

Schechter et al.: "Boron Hydride and Related Compounds." Prepared by Callery Chemical Co. under Contract NO2(s) 10992 for Dept. of Navy, Bureau of Aeronautics. Printed March 1951, declassified December 1953.